United States Patent [19]

Haferl

[11] Patent Number: 4,794,307
[45] Date of Patent: Dec. 27, 1988

[54] RASTER DISTORTION CORRECTION FOR A DEFLECTION CIRCUIT

[76] Inventor: Peter E. Haferl, Feldblumenstrasse 20, CH-8134, Adliswil, Switzerland

[21] Appl. No.: 102,584

[22] Filed: Sep. 29, 1987

[30] Foreign Application Priority Data

Nov. 4, 1986 [GB] United Kingdom ............... 8626316
Nov. 4, 1986 [GB] United Kingdom ............... 8626317

[51] Int. Cl.$^4$ ........................................... H01J 29/56
[52] U.S. Cl. ................................................. 315/371
[58] Field of Search ............... 315/370, 371, 408, 411

[56] References Cited

U.S. PATENT DOCUMENTS

| 4,182,978 | 1/1980 | Boekhorst ........................ 315/371 |
| 4,429,257 | 1/1984 | Haferl . |
| 4,625,154 | 11/1986 | Willis . |
| 4,634,937 | 1/1987 | Haferl . |
| 4,687,972 | 8/1987 | Haferl . |

FOREIGN PATENT DOCUMENTS 2150796 7/1985 United Kingdom .

OTHER PUBLICATIONS

Technical publication 201 published by Philips, Co. dated Apr. 10, 1987.
U.S. patent application Ser. No. 875,708 filed 6/18/86, entitled Raster Correction Circuit, in the name of P. E. Haferl, the above applicant.

Primary Examiner—Theodore M. Blum
Assistant Examiner—Gregory C. Issing

[57] ABSTRACT

East-West modulated current that is generated in an East-West control circuit is coupled to a deflection circuit output stage via a Class A operated amplifier serving as a current source having a high output impedance during retrace. The current source prevents coupling of a signal at a retrace frequency during retrace between a high voltage winding of the flyback transformer and a retrace resonant circuit that includes the deflection winding. The high output impedance of the amplifier current source during retrace maintains the average value of the modulated current during retrace unaffected by an amplitude of a retrace voltage that is developed in the retrace resonant circuit. In this way ultor voltage loading variation is prevented from causing "mouseteeth" distortions.

26 Claims, 7 Drawing Sheets

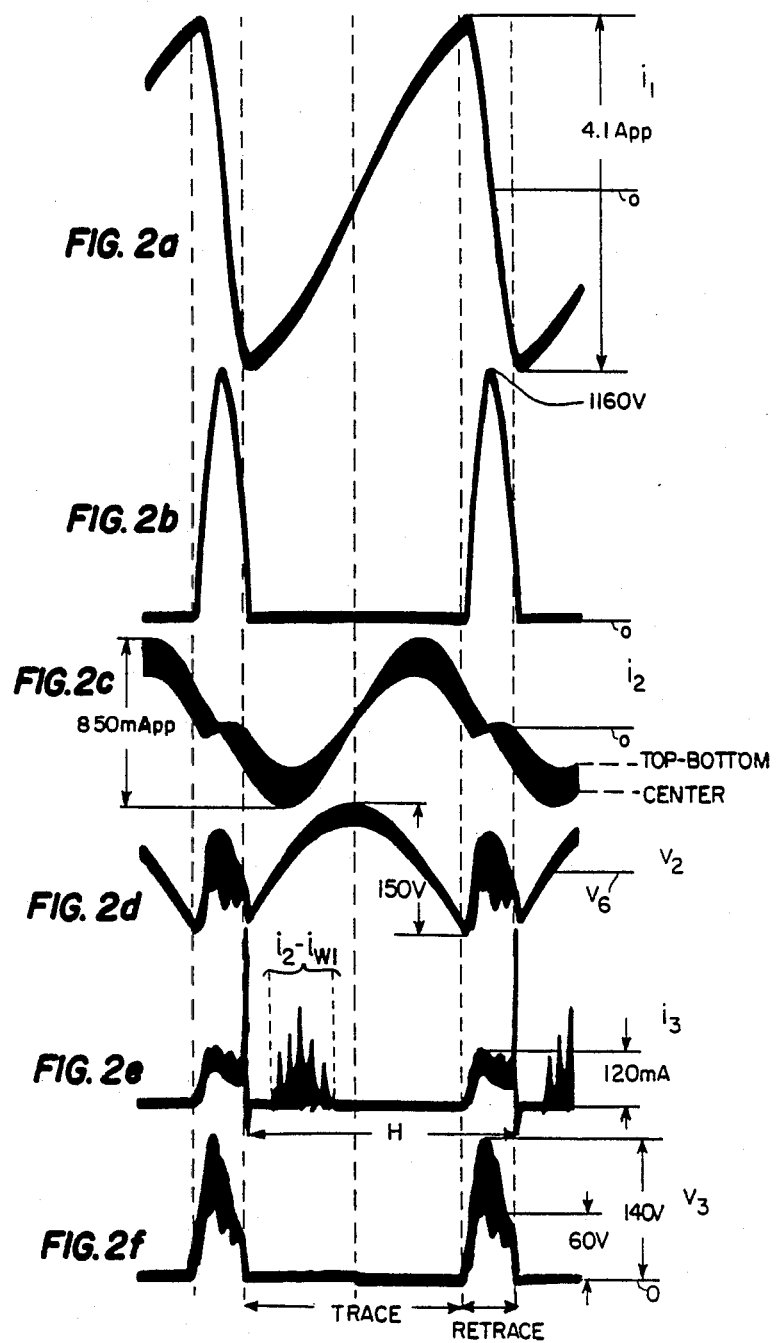

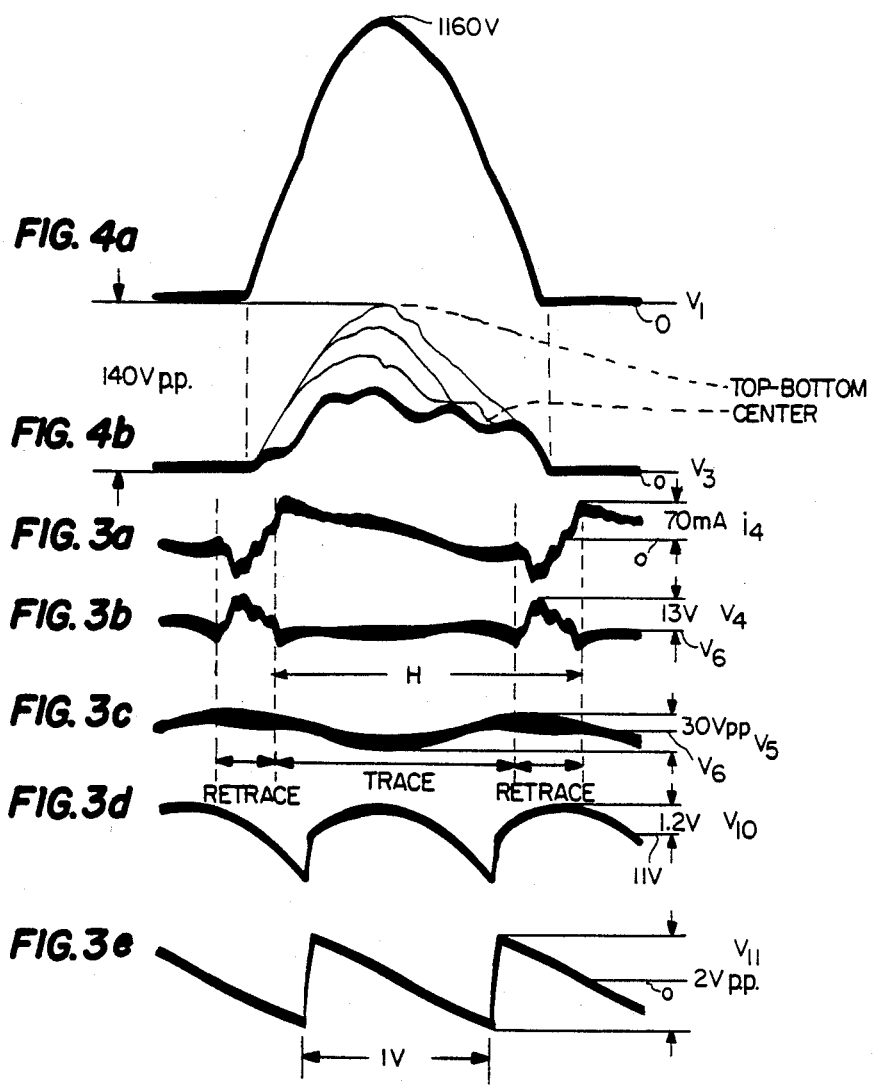

FIG. 7   UNCORRECTED RECEIVER (E-W CIRCUIT INOPERATIVE)

RASTER DISTORTION CORRECTION FOR A DEFLECTION CIRCUIT

This invention relates to a deflection circuit in which the amplitude of the deflection current may be varied or modulated over a relatively wide range by supplying a modulation current from a terminal of a semiconductor having a high output impedance. Modulation of the deflection current amplitude is desired for such purposes as correction of outside and of inside east-west pincushion distortion.

Typically, the horizontal deflection circuit encompasses an output stage that includes a horizontal deflection winding and a trace capacitance that supplies deflection current to the deflection winding during each trace interval. A retrace capacitance is coupled across the deflection winding during the retrace interval to form a retrace resonant circuit. Energy is replenished during retrace via a flyback transformer.

The heavy loading of the high beam current in a secondary winding of the flyback transformer, that occurs in the course of displaying, for example, each white horizontal strip of a crosshatch pattern, such as shown in FIG. 7, represents a heavy load to the flyback transformer during retrace.

In some prior art circuits in which the retrace resonant circuit is coupled via a relatively small modulation inductance of an east-west control circuit to the primary winding of the flyback transformer, the retrace capacitance may be slightly discharged during retrace due to the aforementioned loading. This may result in a discharge current from the trace capacitance into the retrace capacitance through the deflection winding and a slight drop of the voltage across the trace capacitance during the white horizontal strips of the crosshatch pattern. The charge of the trace capacitance is replenished during the retrace intervals associated with the scan lines that display the black picture portion underneath the white crosshatch stripes. This causes a small current in the opposite direction through the deflection winding. The charge and discharge current of the trace capacitance produces a small raster displacement and results in low frequency oscillations modulating the deflection winding trace current. This low frequency modulation may cause each vertical strip of the crosshatch pattern to appear as being of a zig-zag shape, instead of a straight line shape. The zig-zag shape appears in a given vertical strip immediately below the intersection point with a horizontal strip. Such distortions that are sometimes referred to by the name "mouseteeth" distortions are illustrated in the crosshatch pattern of FIG. 7. They appear, during and just after the times in which high beam transients occur, because the deflection circuit that represents a low impedance energy flywheel, supplies the transient increased in energy requirement of the ultor circuits. Thus, energy transferred from the deflection circuit to the ultor circuits may tend to cause variations in the deflection winding trace current.

"Mouseteeth" distortions may be reduced in an arrangement such as described in U.S. Pat. No. 4,634,937, entitled EAST-WEST CORRECTION CIRCUIT in the name of P. E. Haferl that is referred to herein as the Haferl patent, by supplying an E-W modulation current generated by an east-west control circuit via a choke having a high impedance. This choke integrates the horizontal frequency components resulting in a sink current that is substantially a D.C. current that flows from the deflection circuit to the E-W control circuit. Deflection disturbances referred to as "mouseteeth" are avoided because of the loose coupling between the flyback transformer and the deflection winding during the retrace interval. The loose coupling is provided by the choke that provides high frequency isolation of the deflection circuit output stage from the E-W control circuit. It may be desirable to reduce the "mouseteeth" distortion without using such choke that may be expensive.

In accordance with an aspect of the invention, a deflection circuit output stage, responsive to an input signal at a frequency that is related to a deflection frequency, includes a retrace capacitance that is coupled to a deflection winding to form a retrace resonant circuit, during retrace. A supply inductance generates, in accordance with the input signal, a pulse voltage during retrace that is coupled to a load circuit. An E-W control circuit, responsive to a second signal generates a modulation current at a second frequency that is coupled to the retrace resonant circuit via a semiconductor arrangement having a high output impedance. The high output impedance of the semiconductor arrangement isolates the supply inductance from the retrace resonant circuit to prevent load variation in the load circuit from affecting the retrace resonant circuit.

Color television picture tubes with a faceplate radius R greater than 1, such as, for example, Philips 45AX picture tube in which R is equal to 1.6, may require a significantly high amount of inside pincushion correction. The deflection circuit, typically, includes a deflection transistor switch operating at a deflection rate coupled in parallel with a diode damper arrangement. An inside pincushion correction current generated by an inside pincushion correction circuit that is coupled to a trace capacitor, may, disadvantageously, back-bias the diode damper arrangement during trace.

When the diode damper arrangement includes, for example, a pair of series coupled diodes, it may be desirable to couple a junction terminal between the series coupled diodes to ground via a conductive switch throughout the first half trace so a to clamp, via one of the diodes, the collector voltage of the deflection transistor switch to ground potential.

In accordance with another aspect of the invention, the transistor, mentioned before, that has the high output impedance and that supplies the modulated current during retrace to provide outside East-West distortion correction, is coupled at the junction terminal between the diodes. Such transistor that supplies the modulated current during retrace, operates as a switch that is conductive during trace; thus, advantageously, it clamps the collector voltage of the deflection transistor switch to a potential that is close to ground potential.

FIGS. 2a-2f illustrate waveforms useful in explaining the circuit of FIG. 1;

FIGS. 3a-3e illustrate additional waveforms useful in explaining the circuit of FIG. 1;

FIGS. 4a-4b illustrates waveforms, that occur during retrace, and that are useful in explaining the circuit of FIG. 1;

Figure 1:
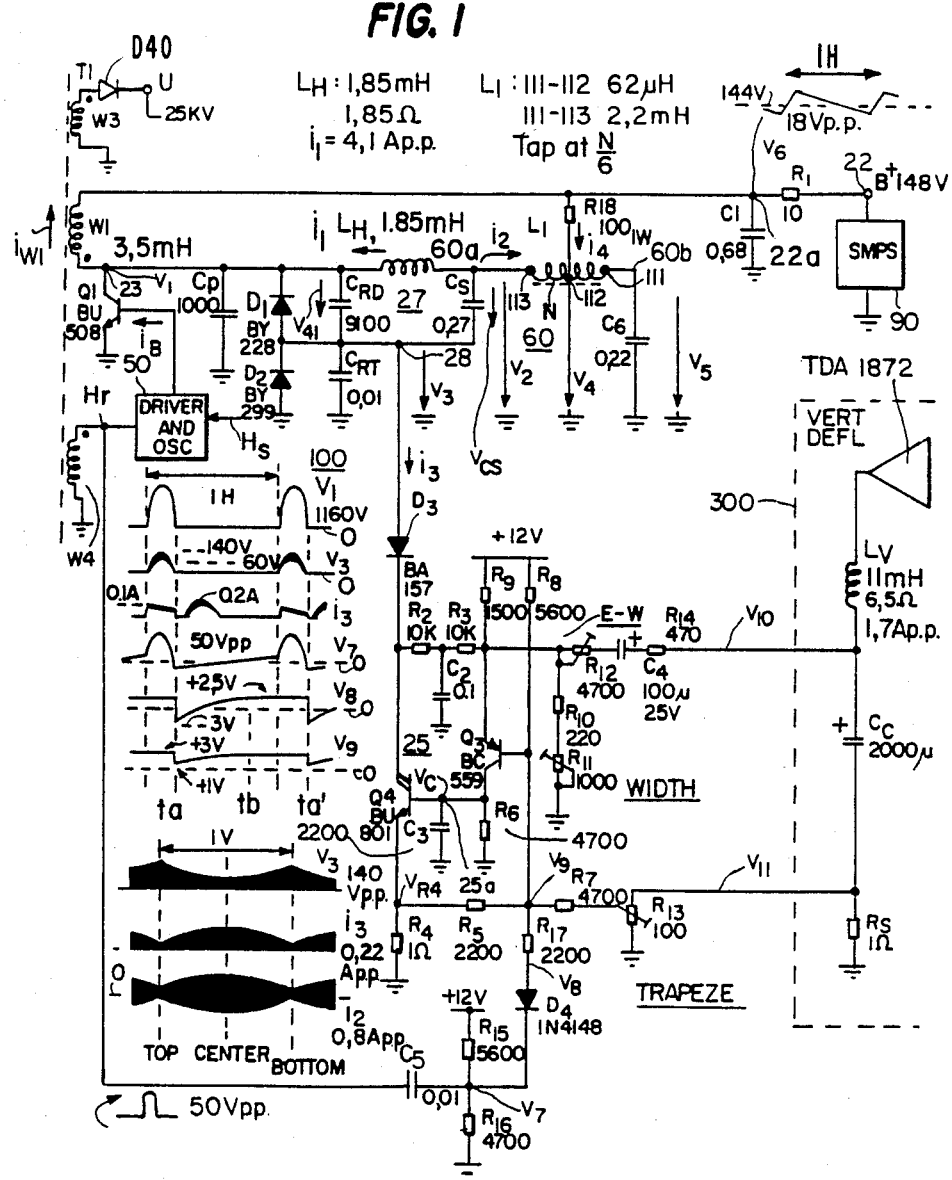
FIG. 1 illustrates a deflection circuit, embodying an aspect of the invention, that includes inside pincushion correction arrangement.

A deflection circuit 100 of FIG. 1, embodying an aspect of the invention, may provide horizontal deflection of the electron beams in, for example, a Philips 110° 45AX FS color picture tube type A66-EAK00X01. In FIG. 1, a source of regulated direct uurrent voltage B+, developed between a terminal 22 and ground, is coupled through a small-valued resistor R1 to a terminal 22a of a primary winding W1 of a horizontal flyback transformer T1. The other terminal of winding W1 is coupled to a junction terminal 23. A filtering capacitance C1 is coupled from terminal 22a to ground. Regulated voltage B+ is generated, for example, by a switched mode power supply 90. A secondary winding W3 of transformer T1, supplies an ultor voltage U through a rectifying diode D40.

A horizontal output transistor Q1, operating at a deflection rate $f_H$ and having its base coupled to a conventionally built driver and oscillator circuit 50, has its collector-to-emitter path coupled between junction terminal 23 and ground. Circuit 50 is synchronized by a sync signal $H_s$ and by a retrace pulse representative signal $H_r$, in a well known manner. Paralleling transistor Q1 is the series arrangement of two rectifiers, diodes $D_1$ and $D_2$ operating as a damper diode arrangement. Coupled in parallel with the anode and cathode electrodes of diode $D_1$ is an arrangement of a horizontal deflection winding $L_H$ that is coupled to an S-shaping, or trace, capacitan $C_S$. A deflection retrace capacitanc $C_{RD}$, coupled also in parallel with the anode and cathode electrodes of diode $D_1$, forms with deflection winding $L_H$, a parallel retrace resonant circuit 27. A second retrace capacitance $C_{RT}$ is coupled between a junction terminal 28 and ground. A small-valued capacitance $C_P$ is coupled between terminal 23 and ground. Capacitance $C_P$ provides fine tuning of the resonance frequency of retrace resonance circuit 27. Coupled between terminal 28 of deflection winding $L_H$, at the junction between capacitance $C_{RT}$ and capacitanc $C_{RD}$, and ground, is a series arrangement of a diode $D_3$ and a controllable East-West current source 25 that includes a current sink transistor $Q_2$ having, at the collector electrode, a high output impedance during retrace. The collector electrode of transistor $Q_2$ is coupled via a diode $D_3$ to terminal 28 to provide a modulated sink current $i_3$ that varies in a vertical rate parabolic manner. Diode $D_3$ decouples the collector of transistor $Q_2$ from ground, toward the end of trace, when diode $D_2$ conducts, to prevent the flow of saturation collector current in transistor $Q_2$, prior to retrace.

An inside pincushion distortion correction circuit 60 includes an inductance L1 that is coupled to a terminal 60a at the junction of capacitance $C_S$ and inductor $L_H$. A capacitor $C_6$ of circuit 60 is coupled between a terminal 60b and ground.

During the first half of trace, deflection current $i_1$ flows, in a direction opposing the arrow, in deflection winding $L_H$ and in diode $D_1$. During the second half of trace, deflection current $i_1$ flows in deflection windin $L_H$, in the direction of the arrow, and in diode $D_2$ and transistor Q1 that is conductive. At the end of trace, transistor Q1 becomes nonconductive and a retrace voltage $V_1$ is developed between terminal 23 and ground.

During the retrace interval, charge is taken away from retrace capacitance $C_{RT}$ by East-West modulated sink current $i_3$ that flows via diode $D_3$. The higher the integral $\int i_3 dt$, over the entire retrace interval, for example, the larger becomes a retrace voltage V41 across capacitance $C_{RD}$ and the smaller becomes a modulated voltage $V_3$ across capacitance $C_{RT}$. The peak of deflection current $i_1$ through deflection winding $L_H$, during the trace interval, is directly related to the peak of retrace voltage V41 across capacitanc $C_{RD}$ at the center of the retrace interval. By modulating current $i_3$ of transistor $Q_2$ at a vertical rate, switched current source 25 provides outside pincushion correction to horizontal scanning current $i_1$. As described later on, the average value of modulation current $i_3$ during each retrace interval is controlled in such a way that it remains unaffected by retrace voltage $V_3$. Thus, transistor $Q_2$ forms, with respect to the average value of current $i_3$, a high output impedance.

In accordance with an aspect of the invention, the above mentioned high output impedance of transistor $Q_2$ that is interposed between winding W1 and retrace resonant circuit 27 prevents, during horizontal retrace, an undesirable high frequency coupling through current source 25 between winding W1 of flyback transformer T1 and retrace resonant circuit 27 that, otherwise, could have caused "mouseteeth" distortion. Moreover, the high output impedance of transistor $Q_2$ prevents any retrace voltage from affecting the collector current in transistor $Q_2$ that provides East-West modulation. In contrast, in some other prior art circuits, "mouseteeth" distortion is prevented by supplying the East-West modulated current, instead of through the high output impedance of the transistor of the present ineention, via a choke having a high impedance. The choke, however, disadvantageously, may be expensive. An example of such prior art is described in the Haferl patent that was mentioned before.

Capacitor $C_{RT}$ is coupled to winding W1 via ground and capacitor $C_1$ to form a second retrace resonant circuit that is coupled to retrace resonant circuit 27 so as to form a combined retrace resonant circuit that inludes winding W1, capacitor $C_{RT}$ and retrace resonant circuit 27. The combined retrace resonant circuit is tuned to, for example, the retrace frequency. In order to tune the combined resonant circuit to the retrace frequency, each of retrace resonant circuit 27 and the second retrace resonant circuit that includes winding W1 and capacitor $C_{RT}$ is tuned to a frequency that may be lower than the retrace frequency.

Capacitor $C_{RT}$ causes the retrace voltage across winding W1 and that across deflection winding $L_H$ to occur simultaneously. Therefore, retrace voltage $H_r$ across winding W4 that provides synchronization information to Driver and oscillator 50, advantageously, contains the same synchronization information as of the retrace voltage across deflection winding $L_H$ or as of voltage V41 across capacitor $C_{RD}$. The purpose of capacitor $C_{RT}$ is described in detail in the Haferl Patent that is incorporated by reference herein.

The values of the capacitors $C_P$, $C_{RD}$ and $C_{RT}$ are selected to obtain the correct retrace time and to avoid retrace time modulation of voltage $V_1$. Capacitor $C_{RT}$ determines the lowest deflection current amplitude that corresponds with current $i_3$ that is zero.

Except for a short interval that occurs immediately at the beginning of retrace when transistor $Q_2$ is still in saturation, transistor $Q_2$ of E-W control circuit 25 of FIG. 1 operates, during the rest of horizontal retrace interval, as a Class A sink current amplifier. Sink current $i_3$ in transistor $Q_2$ develops a proportional feedback voltage $V_{R4}$ across a resistor $R_4$ that is coupled between the emitter of transistor $Q_2$ and ground. Voltage $V_{R4}$ is fed back to the base of a transistor $Q_3$ via a resistor $R_5$. The collector of transistor $Q_3$ is coupled to the base of transistor $Q_2$ at a terminal 25a. The average value of sink current $i_3$, during retrace, is kept independent from variations of the shape and amplitude of voltage $V_3$ by, for example, the negative feedback arrangement of resistors $R_4$ and $R_5$. Therefore, a high output impedance to the average value of current $i_3$ at the retrace frequency and above is established at the collector of transistor $Q_2$. The average value of sink current $i_3$ is adjusted by a width control resistor $R_{11}$, which determines the emitter voltage of transistor $Q_3$, in accordance with a vertical parabola voltage $V_{10}$, that is described below. Thus, the average value of current $i_3$ is modulated at a vertical rate in a parabolic manner in accordance with voltage $V_{10}$.

FIGS. 2a-2f, 3a-3e, and 4a-4b illustrate waveforms useful in explaining the operation of the arrangement of FIG. 1. Similar numbers and symbols in FIGS. 1, 2a-2f, 3a-3h and 4a-4b indicate similar items or functions.

Parabola voltage $V_{10}$ of FIG. 1 is generated across a capacitor $C_c$ of, for example, a conventional vertical deflection circuit 300. Parabola voltage $V_{10}$ of FIG. 3d is AC coupled to the emitter of transistor $Q_3$ of FIG. 1 via a DC blocking capacitor $C_4$, a resistor $R_{14}$ and an adjustable E-W control resisto $R_{12}$.

Retrace voltage $V_3$ is coupled via diode $D_3$ and a time-integrating network, or lowpass filter that includes a resistor $R_2$ and a capacitor $C_2$ that filters out frequencies above the vertical frequency. The lowpass filtered voltage is coupled, via a resistor $R_3$, to the emitter of transistor $Q_3$. The low frequency negative feedback voltage that develops across capacitor $C_2$ causes the average value of voltage $V_3$ to vary in a vertical rate parabolic manner in accordance with vertical parabola voltage $V_{10}$. Because of the negative feedback, the peak, for example, of the vertical rate envelope of voltage $V_3$ is inversely related to the vertical parabola voltage applied across emitter-base junction of transistor $Q_3$ that is obtained from voltage $V_{10}$. Such low frequency feedback arrangement of resistors $R_2$ and $R_3$ provides DC stabilization and improves linearity.

Also applied to the base of transistor $Q_3$ is an adjustable portion of a vertical sawtooth voltage $V_{11}$, that provides trapeze correction, shown in FIG. 3e, that is obtained across a resistor $R_s$ FIG. 1. Resistor $R_s$ is coupled in series with a vertical deflection winding $L_V$ and capacitor $C_c$ of circuit 300.

The downramping slope of current $i_3$, during retrace, having a waveform that is included in FIG. 1, is obtained by a low pass filter formed by capacitor $C_3$ in parallel with a resistor $R_6$ that are, each, coupled between the base of transistor $Q_2$ and ground. Negative feedback voltage $V_{R4}$ across resistor $R_4$ causes the voltage across capacitor $C_3$ to be higher and to cause a higher level of current $i_3$ at the beginning of retrace than at the end of retrace. Thus, voltage $V_{R4}$ tends to reduce, gradually, current $i_3$ via the discharge of capacitor $C_3$, by action of the negative feedback. Advantageously, the power dissipation of transistor $Q_2$ is maintained low, such a $f$ 2 Watts, because, at the beginning of retrace, when current $i_3$ is larger than at the end of retrace, voltage $V_3$ in the corresponding waveform of FIG. 1 is still low. Thus, advantageously, the modulation dynamic range of control circuit 25 that is determined by, for example, the average value of current $i_3$ during retrace, is increased.

High beam load current that flows in a winding W3 of transformer T1 causes a downramping slope of voltage $V_3$ during the second half of retrace and may add harmonic oscillations to voltage $V_3$ as shown in FIG. 2f. The width of retrace pulse voltage $V_3$ that is determined by the instant when voltage $V_3$ is clamped by diode $D_2$ of FIG. 1 to ground potential also limits the modulation dynamic range. Because sink current $i_3$ of FIG. 2e is downramping, during the second half of retrace, the downramping slope of voltage $V_3$ is, advantageously, less steep, during the second half of retrace, than if current $i_3$ would have been, for example, at a constant level, during retrace. Thereby, the dynamic range is, advantageuusly, further increased.

Correction of inside pincushion distortion is accomplished by the "S"-shaping of deflection current $i_1$, in accordance with an inside pincushion correction modulation current $i_2$ that flows in capacitance $C_6$ and in inductor L1 of inside pincushion distortion correction circuit 60. Crrrent $i_2$, that flows in a current path that includes trace capacitance $C_s$, varies a voltage $V_{cs}$ across trace capacitance $C_s$, during trace, at a frequency that is higher than the trace resonance frequency of the trace resonant circuit that includes deflection winding $L_H$ and trace capacitance $C_s$. The amplitude of current $i_2$ is modulated by voltage $V_3$ of FIG. 2f at terminal 28 of FIG. 1 to provide inside pincushion correction. The higher the amplitude of current $i_2$, the higher is the peak-to-peak amplitude of trace voltage $V_{cs}$ that is produced and the more significant is the amount of "S"-shaping of deflection current $i_1$ that is provided, and vice versa. Operation of circuit 60 is described in more detail in U.S. patent application No. 875,708, entitled RASTER CORRECTION CIRCUIT, in the name of P. E. Haferl, filed June 18, 1986 that is incorporated by reference herein.

Capacitance $C_6$ and inductor L1 of circuit 60 form, with trace capacitance $C_s$ and deflection winding $L_H$, a resonance circuit portion of correction circuit 60 during trace. The resonance circuit portion of circuit 60 is tuned by inductor L1 to a frequency that is lower than frequency $f_H$ so that current $i_2$ will not reach zero value prior to the end of horizontal trace; yet, it is tuned to a frequency that is substantially higher than the resonance frequency of the trace resonant circuit of deflection winding $L_H$ and trace capacitance $C_s$. Inside pin modulation inductor L1 may be of a variable type if an adjustable amount of correction is required. For the circuit values shown in FIG. 1, inductor L1 may tune the resonance circuit portion of circuit 60 to a frequency of, for example, 14 KHz.

The portion of voltage $V_{cs}$ that is caused by deflection current $i_1$ is generally a parabola shaped waveform that, in each horizontal period H, is composed of trace and retrace sinewave portions, respectively. During trace, the corresponding sinewave portion of voltage $V_{cs}$ is at a frequency that is approximately equal to the trace resonance frequency of winding $L_H$ and capacitor $C_s$. Such resonance frequency is for example, equal to approximately 7 KHz. During retrace, the corresponding sinewave portion is at approximately 44 KHz.

Inductor L1 and capacitance $C_6$ are included in a circuit branch that, during trace, is coupled in parallel with trace capacitance $C_S$. During the first half of trace, resonance current $i_2$ flows, in a direction opposite to the arrow, from ground, through capacitance $C_6$, inductor L1, capacitacce $C_s$, diode $D_1$, deflection transistor Q1 that is conductive and back to ground. During the second half of trace, current $i_2$ circulates in the direction of the arrow from ground through diode $D_2$, capacitance $C_s$, inductor L1 and capacitance $C_6$ and back to ground.

Deflection current $i_1$ flows, during retrace, in a current path that includes retrace capacitor $C_{RD}$, deflection winding $L_H$ and trace capacitor $C_S$. Trace capacitor $C_s$, that provides low impedance during retrace, prevents current $i_1$ from flowing, throughout retrace, in the branch of circuit 60 that includes capacitance $C_6$ and inductor L1. Because inductor L1 is bypassed by capacitor $C_s$, the deflection inductance during retrace and retrace voltage $V_1$ are, advantageously, not substantially affected by inductor L1. Therefore, circuit 100 of FIG. 1 may, advantageously, require a relatively low level of voltage B+ when operating at higher deflection frequencies such as, for example, $2xf_H$.

During horizontal trace, voltage $V_3$ of FIG. 1 is maintained zero as shown in FIG. 2f. At the center of vertical trace, when current $i_3$ is at a maximum level, horizontal retrace voltage $V_3$ is at minimum that may be for example, at zero volts. Consequently, in this case, it is trace voltage $V_{cs}$ across capacitor $C_s$ that generates resonant current $i_2$. Current $i_2$ of FIG. 2c that flows in capacitor $C_s$ in the same phase as current $i_1$ of FIG. 2a adds in capacitor $C_s$ to current $i_1$ to provide maximum "S" shaping of voltage $V_{cs}$ when current $i_3$ is at the maximum. As current $i_3$ becomes smaller, during vertical trace, horizontal retrace voltage $V_3$ becomes increasingly larger as shown in the corresponding waveforms in FIG. 1. The phase of voltage $V_3$ is shifted by approximately 180° from that of voltage $V_{cs}$, because the positive peak of voltage $V_{cs}$ or $V_2$ of FIG. 2d occurs at the center of horizontal trace; whereas the peak of modulated voltage $V_3$ of FIG. 2f occurs during horizontal retrace. Therefore, voltage $V_3$ of FIG. 1, which is added to voltage $V_{cs}$ across capacitor $C_S$ to form voltage $V_2$, has an opposite effect on current $i_2$ than that of trace voltage $V_{cs}$. When retrace voltage $V_3$ increases, current $i_2$ decreases, causing less modulation of trace voltage $V_{cs}$ or $V_2$ and less "S" shaping. A further increase of retrace voltage $V_3$ causes the amplitude of current $i_2$ to be zero. An even further increase of retrace voltage $V_3$ causes current $i_2$ to flow in the opposite direction.

Thus, current $i_2$ of FIG. 2c that modulates voltage $V_2$ of FIG. 2d is modulated by voltage $V_3$ of FIG. 2f. Since voltage $V_3$ is modulated by current $i_3$ of FIG. 2e, the parabolic waveform of voltage $V_2$ of FIG. 2d is modulated in the vertical rate by current $i_3$ of FIG. 2e to provide inside pincushion distortion correction.

The correction of outside pincushion distortion requires, at the top and bottom of the raster, a lower amplitude of deflection current $i_1$ of FIG. 2a than at the center. The correction of inside pincushion distortion requires a lower amount of "S" shaping at the top and bottom than at the center. At the top and bottom sink current $i_3$ that is lower, causes higher amplitude of retrace voltage $V_3$. The higher amplitude of voltage $V_3$ causes a lower amplitude of current $i_2$. At the center of the vertical trace, sink current $i_3$, that is at a maximum causes the amplitude of retrace voltage $V_3$ to be at a minimum. Accordingly, at the center of vertical trace, the amplitude of each of deflection current $i_1$ and inside pincushion correction current $i_2$ is at a maximum, resulting in more "S" shaping of voltage $V_{cs}$. Advantageously, by selecting the values of the circuit components of circuit 60, a required amount of inside pincushion correction can be obtained for a given amount of outside pincushion correction.

Circuit 60 is coupled in parallel with capacitor $C_{RT}$ during the retrace interval. Therefore, the value of capacitor $C_{RT}$ has to be larger than if circuit 60 was not used, so as to account for the effect of circuit 60 on the total retrace capacitance that is required. Increasing the value of capacitor $C_{RT}$ has a tendency to increase the coupling between flyback transformer T1 and resonant circuit 27 that may, if not accounted for, disadvantageously, increase "mouseteeth" distortions.

A resistor R18 is coupled between terminal 22a and an intermediate terminal, or tap, 112 of inductor L1. Resistor R18 supplies a DC current $i_4$ that bypasses deflection winding $L_H$ and winding W1. Crrrent $i_4$ that flows through resistor R18 and inductance L1, advantageously, stabilizes the DC voltage in capacitor $C_S$ by providing an additional DC current path between supply voltage $V_6$ and capacitor $C_s$.

The average DC voltage of voltage $V_2$ at junction terminal 60a of winding $L_H$ and capacitacce $C_s$ is equal to voltage $V_6$ that is at terminal 22a between capacitor C1 and resistor R18. Thus, advantageously, by supplying a portion of the DC current that is required for maintaining average voltage $V_{cs}$ constant through resistor R18, in addition to the portion that is supplied through winding W1, transient discharge of capacitor $C_s$ due to varying ultor load is, advantageously, reduced; hence, "mouseteeth" distortion is reduced.

The AC portions of voltages $V_2$ of FIG. 2d and $V_5$ of FIG. 3c at the end terminals of inductor L1 have opposite phases. The location of tap 112 of FIG. 1 is selected in such a way that, advantageously, causes voltage $V_4$ at tap 112 of inductor L1 of FIG. 1, that is approximately equal to the average of voltages $V_2$ and $V_5$, to have a minimal AC component, during trace, as shown in FIG. 3b. Consequently, resistor R18 of FIG. 1, that is coupled to tap 112 does not load significantly any of deflection circuit 100 and inside pincushion correction circuit 60 and, therefore, advantageously, does not increase AC losses in circuits 100 and 60.

Current $i_4$ of FIG. 3a that flows in resistor R18 of FIG. 1 is sawtooth shaped because of the ripple voltage of voltage $V_6$. Advantageously, current $i_4$ may correct some of the asymmetrical horizontal linearity errors. Linearity errors occur because of power losses in winding $L_H$ and in inductor L1 during trace that might have caused a slight decrease in voltage $V_4$ at tap 112. The decrease in voltage $V_4$ might have resulted in currents $i_1$ and $i_2$ having smaller amplitudes close to the end of horizontal trace. To correct, at least some of such asymmetrical linearity error, current $i_4$, that is sawtooth shaped, advantageously, reduces the amount of decrease in voltage $V_4$ that might have, otherwise, occurred.

During the first half of trace, current $i_2$ flows, in a direction that is opposite to that of the arrow, from ground, through capacitor $C_6$, inductance L1, and capacitor $C_S$ to junction terminal 28 between diodes $D_1$ and $D_2$. An energy recovery current $i_{w1}$ flowing through winding W1 of flyback transformer $T_1$ in a direction of the arrow, keeps diode $D_2$ conducting as long as current $i_2$ is smaller than energy recovery current $i_{w1}$ and provides a ground return for current $i_2$. However, diode $D_2$ may become nonconductive when the increasing amplitude of current $i_2$ is equal to the decreasing amplitude of energy recovery current $i_{w1}$ in winding W1. Such situation is undesirable because it may cause the trace voltage at terminal 23 of transistor Q1 to rise significantly above ground potential.

In accordance with a further aspect of the invention, sink current transistor $Q_2$ is switched into saturation at the beginning of the horizontal trace interval. Advantageously, this provides a current path for inside pincushion modulation current $i_2$ during the first half of the trace interval. Current $i_2$ causes voltage $V_3$, during trace, to increase so as to bias diode $D_3$ in the forward direction. Because transistor $Q_2$ is saturated, diode $D_3$, advantageously, provides ground return for current $i_2$ via saturated transistor $Q_2$ and clamps voltage $V_3$ to approximately zero volts.

In carrying out a yet further aspect of the invention, transistor $Q_2$ is switched into saturation by retrace pulse $H_r$ across winding W4 that is applied to the base of transistor $Q_3$ through a capacitor $C_5$. A waveform shaping network that includes capacitor $C_5$ and resistors $R_{15}$ and $R_{16}$ generates from pulse $H_r$ an upramping voltage $V_7$, during trace that is shown in the corresponding waveform in FIG. 1. The negative portion of voltage $V_7$ is applied to the base of transistor $Q_3$ via a diode $D_4$ and a resistor $R_{17}$ to form a voltage $V_9$ that causes transistors $Q_3$ and $Q_2$ to saturate. The waveform, that is included within FIG. 1, of voltage $V_9$ shows the base voltage of transistor $Q_3$. At a time $t_a$ in the waveform of voltage $V_9$ in FIG. 1, that occurs at the end of retrace, transistors $Q_3$ and $Q_2$ are driven into saturation by negative going voltage $V_9$. Both transistors $Q_3$ and $Q_2$ remain in saturation until a time $t_b$, when diode $D_4$ is reversed biased that is caused by upramping voltage $V_7$. During the interval $t_b-t_a'$, transistor $Q_2$ is biased for Class A operation that occurs during horizontal retrace after time $t_a'$ so as to provide high output impedance.

FIG. 2b illustrates the waveform of retrace voltage $V_1$ at terminal 23 of FIG. 1. Retrace voltage $V_1$ of FIG. 2b is, advantageously, unaffected by modulation of E-W modulation current $i_3$.

Figure 5:
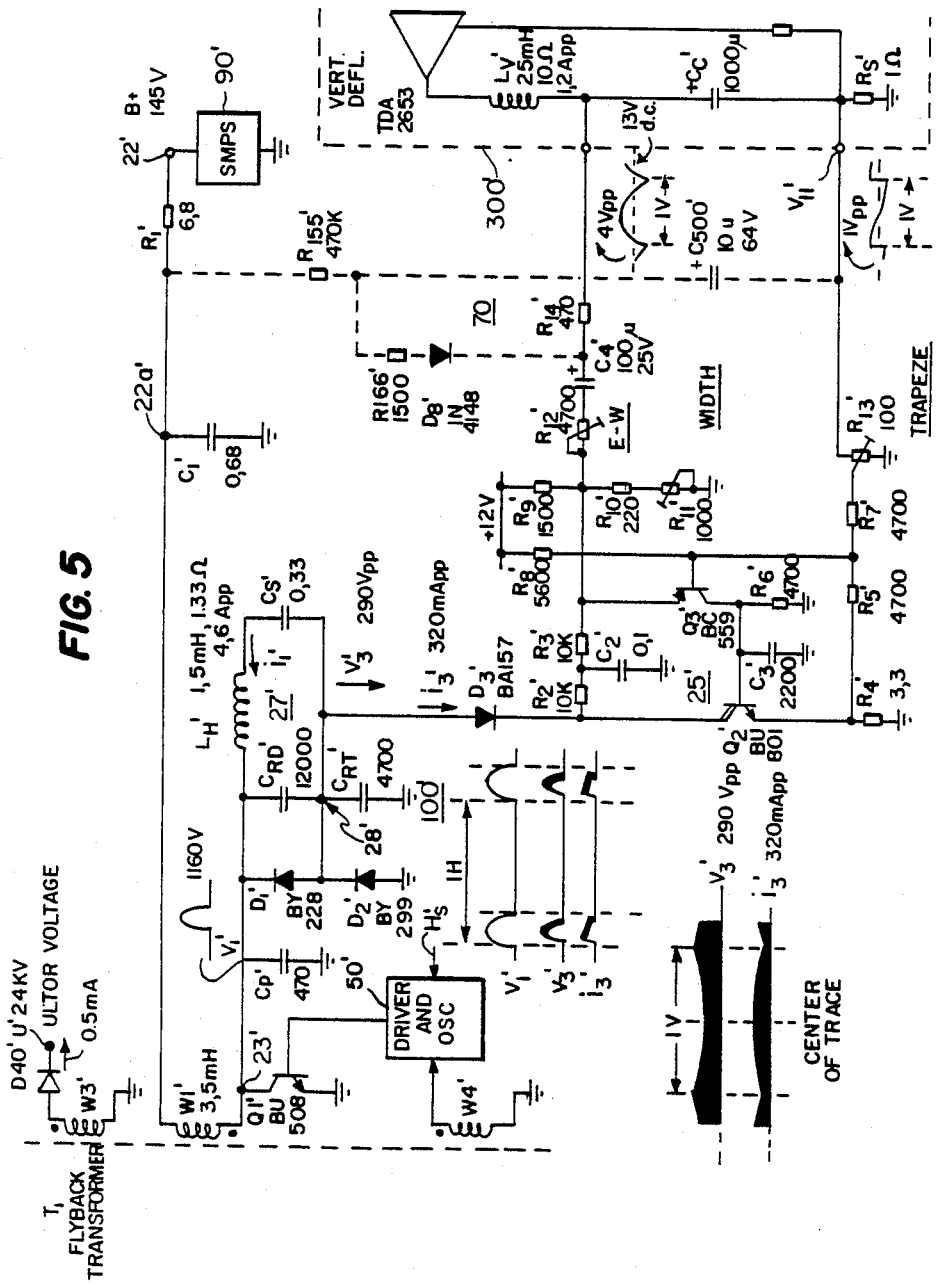
FIG. 5 illustrates a second embodiment of the invention.

FIG. 5 illustrates a second embodiment of the invention, referred to as deflection circuit 100', that may provide East-West corrected deflection current $i_1'$ to a Videocolor 110° PIL-FS 10 picture tube type A6-6EAS00X01. Alternatively, with some changes that are shown in dashed lines, it may be used in conjunction with a picture tube of the 110° COTY SP type. FIGS. 6a–6e illustrate waveforms associated with the circuit of FIG. 5. Similar numbers and symbols in FIGS. 1, 5 and 6a–6e illustrate similar items or functions. Note that inside pincushion correction 60 of FIG. 1 is not incorporated in the circuit of FIG. 5. Transistor $Q_2'$ of FIG. 5 does not operate as a switch during trace; whereas, transistor $Q_2$ of FIG. 1 operates as a switch during trace. In many other respects, deflection circuits 100 of FIG. 1 and 100' of FIG. 5 are similar and operate similarly.

Figure 6:
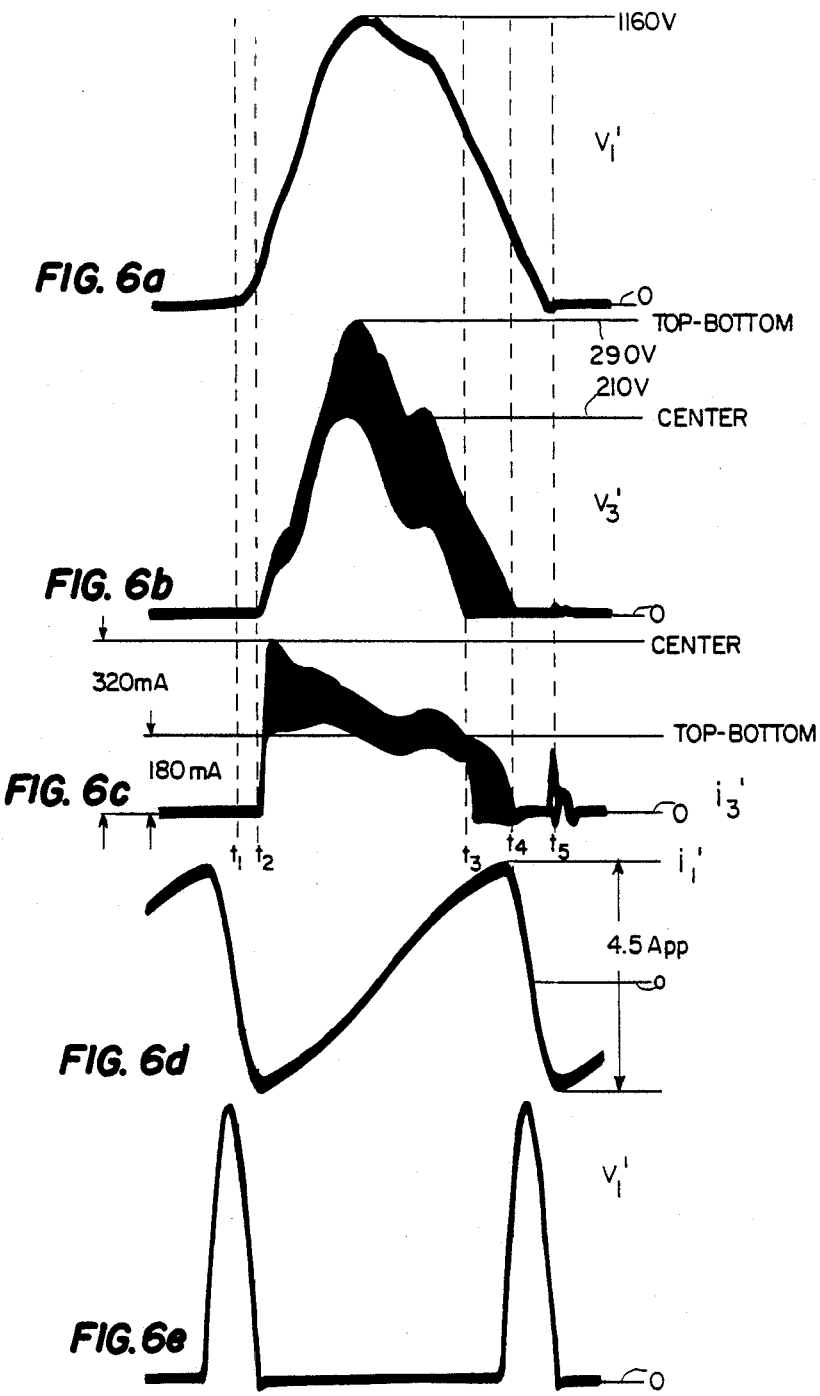
FIG. 6a–6e illustrate waveforms associated with the circuit of FIG. 5.
Figure 7:
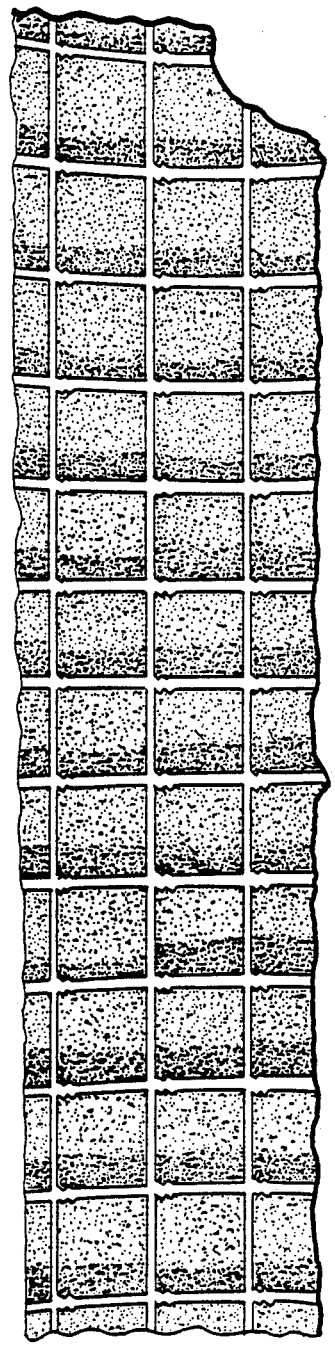
FIG. 7 illustrates a crosshatch pattern in which "mouseteeth" distortion is uncorrected.

FIG. 6a illustrates voltage $V_1'$ across transistor $Q_1'$ of FIG. 5. Note that the amplitude and width of voltage $V_1'$ of FIG. 6a are not affected by the modulation caused by E-W control circuit 25' of FIG. 5. FIG. 6b illustrates voltage $V_3'$ modulated by E-W control circuit 25' of FIG. 5 for obtaining outside pincushion raster correction. The peak retrace voltage across capacitance $C_{RD}'$ is amplitude modulated by the same amount as voltage $V_3'$ of FIG. 6b. Retrace resonant circuit 27' of FIG. 5 resonates at the fundamental retrace frequency.

The trailing edge of the pulse of voltage $V_3'$ of FIG. 6b is modulated by sink current $i_3'$ of FIG. 5. Thus, pulse of voltage $V_3'$ of FIG. 6b, such as shown between time $t_2$ and $t_3$, is narrower at the center of vertical trace than at the top or bottom. Voltage $V_3'$ of FIG. 5 is zero during horizontal trace due to conduction of damper diode $D_2'$. The result is that diode $D_3'$ is reverse biased during this interval.

The amplitude modulation of deflection current $i_1'$ of FIG. 6d is 7%. Power dissipation of transistor $Q_2'$ of FIG. 5 is about 2 Watts.

In television applications with picture tubes having nonspherical faceplates, such as, for example, the RCA 110° COTY SP tube, additional vertical parabola shaping may be required so as to flatten the slope of the parabola at the edges. Such parabola shaping arrangement, an arrangement 70, is drawn in FIG. 5 by dashed lines. The purpose of such arrangement 70 is described in detail in U.S. Pat. No. 4,687,972, entitled, RASTER DISTORTION CORRECTION CIRCUITRY FOR A VIDEO DISPLAY APPARATUS, in the name of P. E. Haferl that is incorporated by reference herein. A capacitor $C_{500}'$ of arrangement 70 that is coupled to voltage $V_{11}'$, having a sawtooth waveform at the vertical rate, is charged by a current that flows in a resistor $R_{155}'$. Capacitor $C_{500}'$ discharges via a resistor $R_{166}'$, a diode $D8'$ and a resistor $R_{14}'$, during the low voltage portion of the vertical parabola voltage. The voltage drop across resistor $R_{14}'$ provides the parabola shaping. The amount of parabola shaping is controlled by the charging current through resistor $R_{155}'$. Capacitor $C_{500}'$ operates as an ideal voltage source and, advantageously, provides suppression of the sawtooth voltage.

Figure 8:
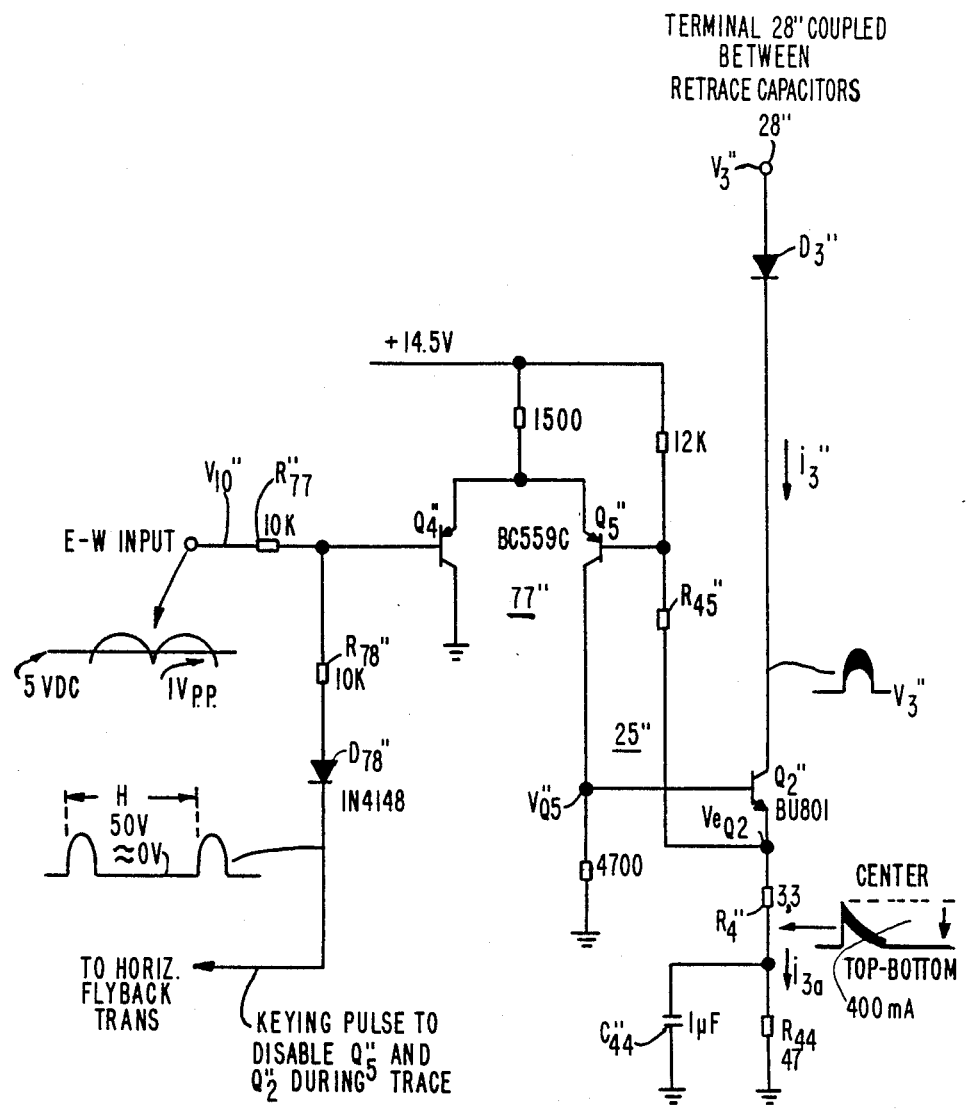
FIG. 8 illustrates a portion of a deflection circuit, forming a third embodiment of the invention.

FIG. 8 illustrates an E-W control circuit 25" that may be used in the arrangement of FIG. 5, for example, instead of control circuit 25'. Similar numbers and symbols in FIGS. 5 and 8 illustrate similar items or functions. Neither transistor $Q_2''$ of FIG. 8 nor, as described before, transistor $Q_2'$ of FIG. 5, operates as a switch during trace.

In control circuit 25" of FIG. 8, during retrace, a vertical rate parabolic signal $V_{10}''$ is coupled through a resistor $R_{77}''$ to a base electrode of a transistor $Q_4''$ of a temperature compensated differential amplifier 77". The base electrode of transistor $Q_4''$ is also coupled through a resistor $R_{78}''$ and a diode $D_{78}''$ to a terminal of a flyback transformer winding such as, for example, winding W4' of FIG. 5. Consequently, throughout trace, the base voltage of transistor $Q_4''$ of FIG. 8 is clamped to approximately 215 volts.

A collector electrode of a transistor $Q_5''$ of amplifier 77" is coupled to the base electrode of a transistor $Q_2''$ to provide a pulse $V_{Q5}''$, during each retrace interval. Pulse $Q_{Q5}''$ has a peak voltage that varies in a vertical rate parabolic manner in accordance with signal $V_{10}''$. The emitter electrode of transistor $Q_2''$ is coupled through a resistor $R_4''$ that is coupled in series with a parallel arrangement of a resistor $R_{44}''$ and a capacitor $C_{44}''$. An emitter voltage $V_{Q2}$ of transistor $Q_2''$ is representative of a collector current $i_3''$ that flows in transistor $Q_2''$. Voltage $V_{Q2}$ is fed back to the base electrode of transistor $Q_5''$ through a resistor $R_{45}''$ that determines the close-loop gain of amplifier 77". Current $i_3''$ is coupled through a diode $D_3''$ to a terminal 28" of a retrace resonant circuit, not shown in FIG. 8, to provide East- West modulation current. The operation of transistor $Q_2''$ and of diode $D_3''$ is similar to the operation of transistor $Q_2'$ and of diode $D_3'$ of FIG. 5, respectively. The negative feedback through resistor $R_{45}''$ of FIG. 8, establishes the average value of current $i_3''$ during each retrace interval, in accordance with parabolic signal $V_{10}''$. In this way, the average value of current $i_3''$, advantageously, is maintained unaffected by the amplitude of retrace voltage $V_3''$ at terminal $28''$. Therefore, mouseteeth distortions are, advantageously, reduced.

What is claimed:

1. A deflection apparatus with raster distortion correction, comprising:

an input signal at a frequency that is related to a first deflection frequency;

a deflection winding;

switching means coupled to said deflection winding that operates, in accordance with said input signal, at said first deflection frequency for generating scanning current in said deflection winding during a trace interval of a given deflection cycle;

a deflection retrace capacitance coupled to said deflection winding to form a deflection retrace resonant circuit that produces a first retrace pulse voltage at a retrace frequency during a retrace interval of said given deflection cycle;

a source of supply voltage;

a supply inductance coupled between said source of said supply voltage and said switching means for generating a second retrace pulse voltage in said supply inductance, said supply inductance being coupled to said retrace resonant circuit during said retrace interval for supplying a supply current from said source of supply voltage that replenishes energy losses in said retrace resonant circuit;

a load circuit energized by said second retrace pulse voltage in said supply inductance;

a source of a modulation signal; and controllable semiconductor means responsive to said modulation signal for generating a modulation current that is coupled to said retrace resonant circuit to modulate said scanning current for providing raster distortion correction, said semiconductor means forming an output impedance that during said retrace interval is large for substantially isolating said supply inductance from said retrace resonant circuit during said retrace interval.

2. An apparatus according to claim 1 wherein said first deflection frequency is a horizontal deflection frequency and wherein said output impedance has a value that is substantially higher at said horizontal deflection frequency, than at least one of said deflection winding and said supply inductance.

3. An apparatus according to claim 1 wherein said semiconductor means comprises an amplifier that maintains an average value of said modulation current during said retrace interval unaffected by said first retrace pulse voltage.

4. An apparatus according to claim 3 wherein said amplifier operates as a Class A amplifier.

5. An apparatus according to claim 1 wherein said semiconductor means forms said output impedance that is high at a collector electrode of a transistor for preventing a variation of a load current in said load circuit from affecting said modulation current.

6. An apparatus according to claim 1 wherein said supply inductance comprises a winding of a flyback transformer.

7. An apparatus according to claim 6 wherein said load circuit is coupled to a second winding of said flyback transformer to produce an ultor voltage.

8. An apparatus according to claim 1 further comprising, a second retrace capacitance that couples said supply inductance to said retrace resonant circuit for causing said second retrace pulse voltage to contain the same synchronization information as said first retrace pulse voltage.

9. An apparatus according to claim 1 further comprising, a second retrace capacitance that couples said supply inductance to said retrace resonant circuit to form a second retrace resonant circuit that is tuned to said retrace frequency and that includes said first retrace resonant circuit, said supply inductance and said second retrace capacitance.

10. An apparatus according to claim 1 further comprising, means responsive to said modulation signal and coupled to said semiconductor means for generating said modulation current having a downramping slope during said retrace interval.

11. An apparatus according to claim 1 wherein said supply inductance comprises a flyback transformer having a first winding coupled to said source of supply energy and a high voltage winding across which is developed said second pulse voltage, wherein said load circuit comprises a high voltage circuit for deriving from said second pulse voltage that is developed across said high voltage winding an ultor voltage at an ultor terminal and wherein said semiconductor means includes a transistor that prevents variations of a beam current loading in said ultor terminal from substantially affecting said retrace resonant circuit.

12. An apparatus according to claim 1 wherein said source of modulation signal is at a vertical rate, and said first deflection frequency is at a horizontal rate.

13. An apparatus according to claim 1 wherein said semiconductor means comprises a transistor that is responsive to a signal at a horizontal frequency, said transistor operating as a conductive switch during said trace interval, having a low output impedance.

14. An apparatus according to claim 13 wherein said transistor operates as a Class A amplifier having said high output impedance during said retrace interval such that said modulation current is supplied via a collector electrode thereof.

15. An apparatus according to claim 1 further comprising, a trace capacitance coupled to said deflection winding to form with said deflection winding a first trace resonant circuit during said trace interval such that said scanning current that flows in said trace capacitance develops, during said trace interval, a parabolic voltage in said trace capacitance, and a circuit branch for generating in said circuit branch a second modulation current at an amplitude that is modulated in accordance with said modulation current, said second modulation current being coupled to said trace capacitance to vary said parabolic voltage in said trace capacitance in a manner to reduce inside pincushion distortion.

16. An apparatus according to claim 15 wherein said trace capacitance acts as a low impedance bypass capacitance for said scanning current around said circuit branch substantially throughout said retrace interval.

17. An apparatus according to claim 15 wherein said circuit branch comprises a second capacitance and a modulation inductance that form a second trace resonant circuit with said first trace capacitance and with said deflection winding such that said second trace resonant circuit is tuned to a frequency that is higher than the resonance frequency of said first trace resonant circuit.

18. An apparatus according to claim 15 wherein said semiconductor means comprises a transistor that is responsive to a horizontal rate signal that causes said transistor to operate, during said trace interval, as a switch that is conductive.

19. An apparatus according to claim 1 wherein said switching means is conductive during at least a first portion of said trace interval to maintain a voltage at a terminal of said switching means at a predetermined substantially constant level during said trace interval and wherein said semiconductor means comprises a transistor that operates as a switch that is conductive during at least a second portion of said trace interval when said switching means is nonconductive for maintaining said voltage at said terminal of said switching means at substantially said predetermined constant level throughout said trace interval.

20. An apparatus according to claim 19 wherein said switching means comprises a second transistor and an arrangement of a pair of series coupled diodes that is coupled across said second transistor and wherein said first transistor that is conductive during said second portion of said trace interval is coupled at a junttion terminal between said diodes to maintain a low impedance across one of said diodes when said one of said diodes is nonconductive.

21. A power supply and modulated deflection apparatus comprising:
an input signal at a frequency that is related to a first deflection frequency;
a deflection winding;
switching means coupled to said deflection winding and operated, in accordance with said input signal at said first deflection frequency to generate scanning current in said deflection winding during a trace interval of a deflection cycle;
a deflection retrace capacitance coupled to said deflection winding to form a deflection retrace resonant circuit that produces a first retrace pulse voltage at a retrace frequency during a retrace interval of said deflection cycle;
a source of supply voltage;
a supply inductance coupled between said source of supply voltage and said retrace resonant circuit for generating a second retrace pulse voltage in said supply inductance;
a load circuit energized by said second retrace pulse voltage in said supply inductance;
a source of a modulation signal; and
a transistor responsive to said modulation signal and coupled to said retrace resonant circuit for supplying a modulation current that produces modulation of said scanning current such that said modulation current replenishes energy losses in said retrace resonant circuit, said transistor having an output impedance that is high so as to isolate, during said retrace interval, said load circuit from said retrace resonant circuit for preventing a variation of said load current that occurs during said retrace interval from affecting said retrace resonant circuit.

22. A power supply and modulated deflection apparatus comprising:
an input signal at a frequency that is related to a first deflection frequency;
a deflection winding;
switching means coupled to said deflection winding and operated in accordance with said input signal at said first deflection frequency to generate scanning current in said deflection winding during a trace interval of a deflection cycle;
a deflection retrace capacitance coupled to said deflection winding to form a deflection retrace resonant circuit that produces a first retrace pulse voltage at a retrace frequency during a retrace interval of said deflection cycle;
a source of supply voltage;
a supply inductance coupled between said source of supply voltage and said retrace resonant circuit for generating a second retrace voltage and for providing a current path from said source to said retrace resonant circuit through which an input supply current that replenishes energy losses in said retrace resonant circuit is supplied;
a load circuit energized by said second retrace pulse voltage in said supply inductance;
a source of modulation signal; and
a transistor, responsive to said modulation signal, for generating, in accordance with said modulation signal, said modulation current that modulates said scanning current, said transistor having an output impedance that, during said retrace interval, is high for preventing at least one of said first and second retrace pulse voltages from affecting said modulation current.

23. An apparatus according to claim 22 further comprising means responsive to said modulation current and coupled to a control electrode of said transistor for providing, via a negative feedback signal path, a feedback signal representative of said modulation current, said feedback signal being coupled to said control electrode so as to cause said modulation current to be in accordance with said modulation signal.

24. An apparatus, according to claim 22 wherein said first deflection frequency is at a horizontal rate and said modulation signal is parabolic at a vertical rate.

25. An apparatus according to claim 24 further comprising low-pass filter having a cutoff frequency that is substantially lower than said horizontal rate, said low-pass filter being coupled to a main current conducting electrode of said transistor, said low pass filter providing a second feed-back signal path at said vertical rate that is representative of avvertical rate voltage component of a retrace voltage at said main current conducting electrode.

26. An apparatus according to claim 22 wherein said switching means comprises a pair of series coupled rectifiers and wherein a collector electrode of said transistor is coupled at a junction terminal between said rectifiers, said apparatus further comprising first and second retrace capacitance, each being coupled to said junction terminal for developing thereat a portion of said second retrace voltage that is generated in said supply inductance such that said modulation current causes an amplitude of said portion of said retrace voltage at said junction terminal to vary at a vertical rate parabolic manner, in accordance with said modulation signal.

* * * * *